Feb. 4, 1969 E. W. BOWEN 3,425,887
HEAT SEALER
Filed Dec. 16, 1964 Sheet 3 of 3
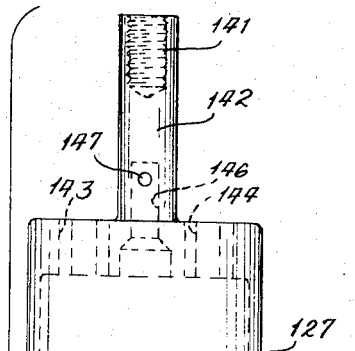
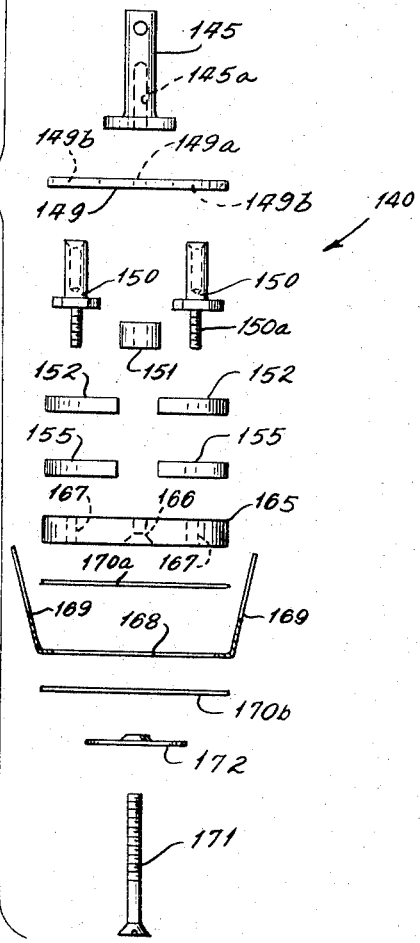
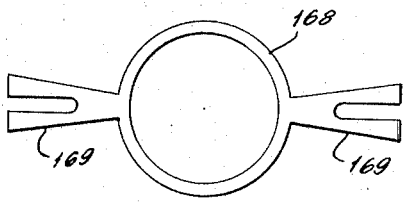
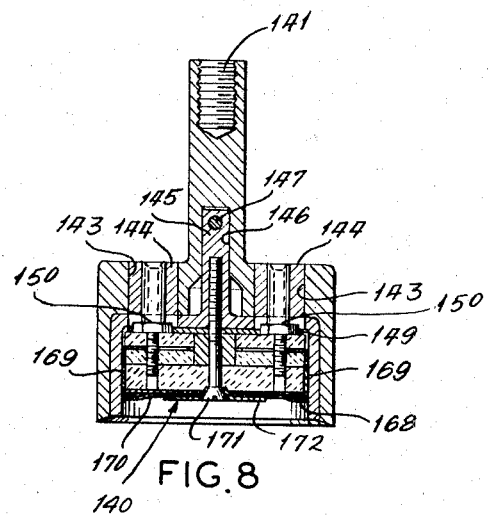
INVENTOR:
ELDRED W. BOWEN
BY Gravely, Lieder + Woodruff
ATTORNEYS.

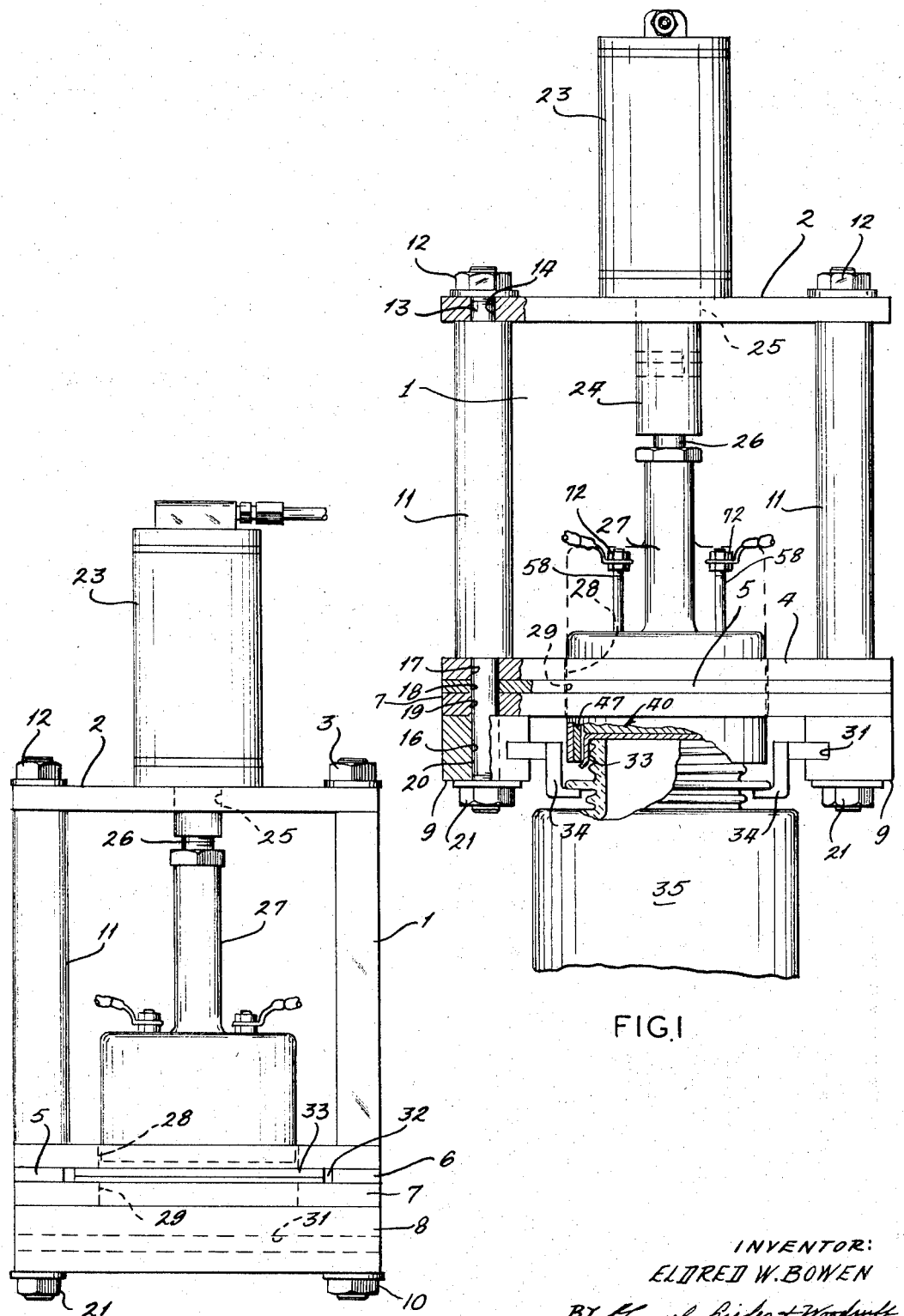

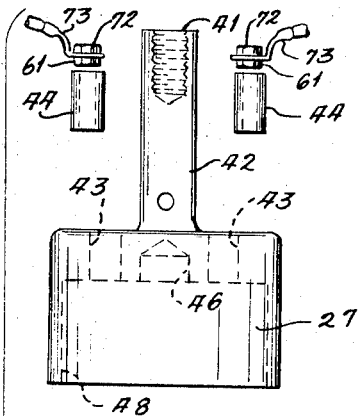
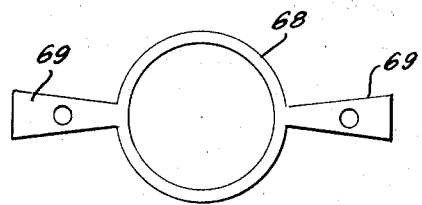
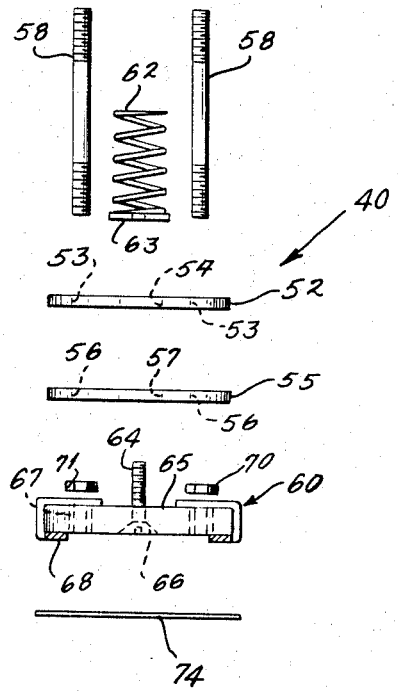
FIG.3
FIG.4
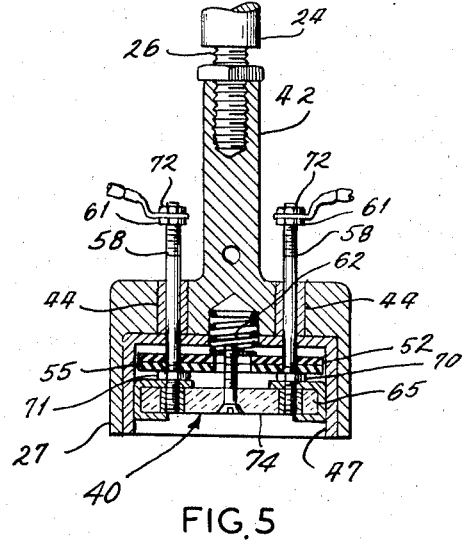
FIG.5
INVENTOR:
ELDRED W. BOWEN
BY Gravely, Lieder + Woodruff
ATTORNEYS.

United States Patent Office 3,425,887
Patented Feb. 4, 1969

1

3,425,887
HEAT SEALER
Eldred W. Bowen, Brentwood, Mo., assignor to Pet Incorporated, a corporation of Delaware
Filed Dec. 16, 1964, Ser. No. 418,723
U.S. Cl. 156—518   17 Claims
Int. Cl. B65b 7/00, 51/10; B30b 15/34

ABSTRACT OF THE DISCLOSURE

A heat sealer for applying a thermosetting adhesive backed closure to a pour opening including means for cutting the closure and a flat ringlike heater positioned against an insulated backing and fitting within the cutter die to position the closure and seal it against the pour opening.

---

This invention relates to heat sealer mechanisms and more particularly to heat sealer apparatus for cutting seal or closure members from a continuous strip and heat sealing such members to the mouth of a container for liquids. More specifically the invention appertains to heat sealer for sealing plastic bags of aseptically filled edibles, such as an ice cream mix.

In accordance with the invention, the heat sealer is capable of punching out a seal having thermosetting adhesive on one side and applying the seal to the face edge of a container member. Briefly, the invention contemplates an open head punch or die and forming cup for cutting a seal member from a continuous strip of a thermosetting adhesive backed material and for positioning the seal member about the pour spout and over the face edge or lip of a container member to be sealed. The die head includes a heatable plunger that seats the seal member abutting the face edge and heats the thermosetting adhesive to secure the seal member in position. Heating of the plunger is achieved by an isolation transformer controlled with a variable voltage transformer. The heat cycle of the transformers is adjusted by an automatic timer. The operation of the punch is controlled by an air operated piston. The entire heat sealer mechanism is designed to provide aseptic sealing capabilities.

It is therefore an important object of the invention to provide an aseptic heat sealing mechanism for cutting out seals and applying such to a suitable container.

It is another object of the invention to provide an aseptic heat sealer for punching out thermosetting adhesive backed seals, applying them to the face edge of a container spout and heat cycling the seals until they adhere to the container spout.

It is another object of the invention to provide a heat sealer for aseptic application of a thermosetting adhesive backed seal to the edge of a container spout.

It is another object of the invention to provide a heat sealer having an air operated punch with a die face including a circular heating element that punches out a circular adhesive backed seal that fits the seal about the pour spout of a container held in a fixed position and that heats the seal during a timed cycle to secure the seal to the face edge of such pour spout.

It is still another object of the invention to provide a heat sealer that includes an air operated punch die which has the inner face insulatively coated and supports a plunger having a circular heating element about the peripheral working face thereof covered by impregnated fiber glass wherein the die cuts a circular seal from a strip of thermosetting adhesive backed foil and positions such seal about the pour spout of a container, and the plunger heat seals the adhesive backed foil to the face edge of the pour spout.

It is a further object of the invention to provide a heat

2 sealer for aseptic application of a thermosetting adhesive backed seal to a pour spout of a plastic bag container wherein the container is held in a fixed position under the open face of a punch die that retains a disk member having a face heating element coated with Teflon impregnated fiber glass and wherein the punch cuts the adhesive backed seal from a continuous ribbon thereon and forms the seal about the pour spout with the disk member urging the seal against the face edge of the pour spout after which the heating element is energized for a time cycle to adhere the thermosetting seal, and then the punch die is released and the aseptically sealed container is withdrawn.

These and other objects and advantages of the invention will be appreciated from the ensuing detailed description taken with the appended claims in conjunction with the drawing wherein:

FIG. 1 is a partly broken away, front elevational view of the heat sealer;

FIG. 2 is a side elevation view of the heat sealer;

FIG. 3 illustrates in an exploded, partly cross section view the punch die and heatable plunger assembly appertaining to the invention;

FIG. 4 is a plane view depicting a suitable heating element for the plunger;

FIG. 5 is a cross sectional view of the assemble punch die and heatable plunger appertaining to the invention;

FIG. 6. is an exploded, partly cross section view of the preferred punch and heat sealer;

FIG. 7 is a plane view depicting the preferred heating element; and

FIG. 8 is a cross sectional view of the preferred punch die and heatable plunger appertaining to the invention.

Referring to the drawings, and particularly FIGS. 1 and 2, the heat sealer is supported from back plate 1 by a mounting bracket (not shown). Cylinder mounting plate 2 is attached to back plate 1 by bolts 3. Guide plate 4, separator bars 5 and 6, die plate 7 and guide tracks 8 are attached to back plate 1 by bolts 10. At the front of the heat sealer spacer bolts 11 separate mounting plate 2 from guide plate 4 the same distance as back plate 1. Nuts 12 secure mounting plate 2 to spacer bolts 11 by threaded stud 13 projecting through aperture 14. Threaded studs 16 of spacer bolts 11 project through apertures 17 of guide plate 4, apertures 18 of front separator bar 5, apertures 19 of die plate 7 and apertures 20 of guide tracks 9. Nuts 21 secure guide plate 4, separator bar 5 and die plate 7 to spacer bolts 11. Supported atop mounting plate 2 is air cylinder 23 with plunger casing 24 projecting through aperture 25. Drive rod 26 threadedly engages the throat of punch die 27. In the raised position (see FIG. 2), die 27 projects just within guide aperture 28. In the lowered position die 27 projects through guide aperture 28 and die plate aperture 29 to just below slots 31 in guide tracks 9. Guide plate 4 and die plate 7 separated by separator bars 5 and 6 define feed passage 32 for adhesive backed seal strip 33 (see FIG. 2). The strip 33 is passed through the passage 32 between feed and take-up reels (not shown). Half collar carrier 34 rides in slots 31 of guide tracks 8 and supports plastic containers 35, to be sealed, properly aligned under die plate 7.

Considering FIGS. 3, 4 and 5, the die 27 and sealer plunger 40 are illustrated in detail. The die 27 has a threaded bore 41 axial with shank 42. The heel of die 27 has a pair of apertures 43 wherein Teflon or other suitable insulator sleeves 44 are force fitted. The heel has an internal bore 46 which provides a spring seat. Teflon forming cup 47 seats in cup face 48 of die 27. Cup 47 has a pair of apertures 49 which align with inserts 43. Cup 47 also has aperture 51 having a diameter equal to that of bore 46. Sponge rubber disc 52 with side apertures 53 and central aperture 54 seats in cup 47. The aperture 54 has a smaller diameter than bore 46. Rubber disc 55 with side apertures 56 and central aperture 57 seats in cup 47 against sponge disc 52. Threaded electrical conductor rods 58 project through inserts 44, apertures 49, 53 and 56. Teflon plunger heater member 60 threadedly receives rods 58. Nuts 61 afford stops for conductor rods 58 and are biased against inserts 44 by spring 62 and plunger disc 63. Flat head screw 64 secures heater member 60, rubber disc 55 and sponge disc 52 assembled to plunger disc 63.

Plunger heater member 60 includes Teflon disc 65 with a countersunk bore 66 and threaded apertures 67 which receive conductor rods 58. Flat heater ring or element 68 has wide-tab, apertured contacts 69 (see FIG. 4). The closed shape a ring like portion of the heater element 68 seats against the peripheral face edge of disc 65, while the tab-like contacts 69 fold up and around with the apertures aligned with threaded apertures 67. Conductor rods 58 carry nuts 71 which make positive electrical contact with heater tabs 69. Nuts 72 secure electrical leads 73 against nuts 61 to make positive electrical contact with conductor rods 58. Electrical leads 73 are attached to an isolation transformer (not shown) controlled by a variable voltage transformer (not shown). An electrical timer (not shown) controls the time cycle during which the heater element 68 is energized. To prevent heater element 68 from sticking to the seal cutout from seal strip 33, coating 74 of Teflon impregnated fiber glass is applied over the face of Teflon disc 65. Typically, circular heater element 68 may be 4 mil thick Nichrome ring, ⅛ inch wide with an internal diameter of 1⅞ inches with the tabs 69 a ¼ inch wide at the juncture with the ring diameter and about ½ inch wide at the edge. The tabs 69 are about 1 inch long with 3/16 inch diameter apertures centered therein.

In operation of the heat sealer, a container is placed in half collar carrier 34 and positioned under aperture 29 in die plate 7 with the punch die 27 in the raised position. An uncut area of seal strip 33 is drawn under aperture 28 of guide plate 4. Air cylinder 23 is activated, under pressure of a sterilized air supply which has been previously heated to 600° F. and cooled for that purpose, and die 27 descends cutting a circular seal from seal strip 33 against the peripheral edge of aperture 29 in die plate 7. As punch die 27 continues downward, forming cup 47 rolls the edges of the circular seal down around the pour spout of container 35. At the same time, plunger heater member 60 engages the central portion of the circular seal and biases such, via spring 62, against the face edge of the pour spout in container 35. With the circular seal biased against the pour spout, heater 68 is energized for a period of time sufficient to thermoset the adhesive to secure the circular seal to the face edge of the pour spout. Next, the power to heater 68 is cut off and the circular seal allowed to cool, then the punch die 27 is raised ready to make the next seal.

Referring to FIGS. 6, 7 and 8, the preferred embodiment of the heat sealer includes die 127 and heat sealer disc 140. The die 127 has a threaded bore 141 axial with shank 142. The heel of die 127 has a pair of apertures 143 wherein Teflon or other insulated sleeves 144 are press fitted. A spacer plug 145 seats in counter-sunk internal bore 146 at the lower end of shank 142. Spacer plug 145 has a threaded bore 145a. A removable retainer pin 147 maintains spacer plug 145 held within bore 146. Teflon forming cup 148 seats in the cup face of die 127. Forming cup 148 has a central aperture 148a which is larger than bore 146, as well as a pair of apertures 148b larger than apertures 143. Teflon insulator disc 149 seats in forming cup 148. The insulated disc 149 has a central aperture 149a which is aligned with threaded bore 145a in spacer plug 145. Banana connector sockets 150 with threaded studs 150a are received in sleeves 144 and seated in apertures 149b. Studs 150a protrude through apertures in semi-circular segments 152 and are threadably received within apertures in semi-circular segments 155. Segments 152 and 155 are of high conductivity material such as Monel. Banana connector sockets 150 fit in apertures 149b and project through Teflon sleeves 144.

Heat sealer disc 140 includes insulated disc 165 (preferably made from Teflon) having a central aperture 166 and a pair of diametrically spaced apertures 167. The face of disc 165 has a piece of Teflon tape 178a thereover. Heater lement 168 is placed against tape 170a with wide tab, slotted contacts 169 folded upward. With segments 155 seated on the top of disc 165, the slotted contacts 169 fit around studs 150a intermediate segments 152 and 155 (see FIG. 8). Consequently, segments 152 and 155 afford good heat dissipation for quick cooling of heater element 168 and provide good secure electrical contact to connector 150. Studs 150a align with apertures 167 to permit protrusion into apertures 167. A rectangular Teflon separator 151 seated over aperture 166 divides each pair of circular segments 152 and circular segments 155 to prevent electrical shorting between banana connectors 150. Heater disc 140 has a second piece of Teflon tape 170b placed over heater element 168 and the face of disc 165. The heat sealing members are assembled together with bolt 171 which passes through washer 172, the Teflon tape, aperture 166, separator 151, and aperture 149a, and is threadedly received in bore 145a. Thus, it will be seen that the entire assembly within forming cup 148 is held together as a complete unit, and is retained within the forming cup by pin 147 in spacer plug 145. When in use banana jacks (not shown) are plugged into banana connectors 150 to afford electrical contact from tabs 169 of heater element 168 to a heating source or power supply similar to that used for the embodiment disclosed in FIGS. 3, 4 and 5. Whenever it is necessary to remove heat disc 140 to replace the heater element or repair the unit, the old assembly may be removed and a new assembly may be inserted in the forming cup 148 by merely disconnecting and connecting banana plugs with banana connectors 150 and removing and reinstalling retainer pin 147. In this way, the use of an entire heat sealer die and disc assembly is not lost during rework or repair of a heater assembly.

In operation of the heat sealer using the preferred embodiment with die 127, forming cup 148 and heat sealer disc 140, the container to be sealed is placed under die 127 in a fashion similar to that used for punch die 27. As the die 127 descends under air pressure in the pneumatic cylinder, it cuts a heat sealable circular seal from a continuous strip of seal material. As the die 127 continues to move downward, forming cup 148 rolls the seal down around the container pour spout. Next, the heat sealer disc 140 engages the circular seal forcing the seal against the pour spout of the container. The resilience of the pour spout, the Teflon heat sealer disc and the Teflon insulator is sufficient to insure that the circular seal is uniformly seated against the entire pour spout of the container thus insuring that on activating the heater element a uniform heat seal will be achieved. Again, the entire operation of the heat sealer punch die 127 is essentially identical to that of punch die 27 with the exceptions pointed out as to the difference in the construction between the heat sealer and disc 140 and the sealer plunger 40.

In summary, it will be understood that the heat seal apparatus is provided for use in a sterilized chamber to apply heat sealable closures or lids on containers which are aseptically filled with various edibles such as ice cream mix. Although not illustrated, many suitable enclosures or chambers for handling edibles aseptically are well known and hence are not described in detail herein.

It will be appreciated that many modifications and changes in the foregoing disclosure of the invention will be apparent to those skilled in the art, and all such changes and modifications are deemed to be within the scope of the invention which is limited only as necessitated by the appended claims.

What is claimed is:

1. A heat sealer for attaching a thermosetting adhesive backed closure to a pour opening of a container comprising:
   (a) a head,
   (b) a flat-ring peripheral heater member of uniform cross sectional area carried by said head having at least a pair of diametrically opposed electrical contacts,
   (c) means to bias said head toward the closure with the heater member forcing the adhesive backing uniformly against the pour opening,
   (d) means to supply electric energy to said electrical contacts of said heater member to thermoset the adhesive backed closure.

2. The structure of claim 1 wherein the heater member is a continuous ring and the contacts are narrowed towards their juncture with the ring.

3. The structure of claim 2 including an insulating backing member for the heater member with the contacts being formed about the backing member and including conductors joined to the wider ends of the contacts.

4. The structure of claim 3 including resilient means separating the backing member and the head to more securely seat the heater against the closure member.

5. The structure of claim 3 including rapid heat conducting members positioned to the insulating member and connected to the wider ends of the heater conductors to rapidly dissipate heat from the heater.

6. The structure of claim 5 including receptacles connected to the heater conductors and communicating with the interior of the heat to afford rapid plug-in type electrical connection to the heater.

7. The structure of claim 6 wherein the heater, backing member, rapid heat conducting member and plug-in electrical conductors are in a unitary package and including means for rapidly removing and attaching the same to the head to facilitate repair and replacement of said package.

8. An apparatus for cutting individual closures from a continuous strip of thermosetting material and for applying the individual closures to a tubular pour opening of a container, said apparatus comprising a die member provided with an aperture, feed means for guiding the strip of thermosetting material across the die member and aperture, carrier means for supporting the pour opening of the container on one side of and in registration with the aperture, a die punch reciprocally mounted for movement toward the continuous strip and into the opposite side of the aperture so that a closure is cut from the continuous strip as the die punch enters the aperture, and a heater element carried by the die punch and being a closed shape which conforms to the configuration of the end of the pour opening, the heater element being positioned on the die punch such that it will align with and overlie the end of the pour opening when the die punch is moved into the aperture so as to engage the closure and activate the thermosetting material whereby the closure is bonded to the end of the pour opening, the heater element further having a pair of contacts formed integral therewith and adapted to be placed at a different electric potential for elevating the temperature of the heater element.

9. The structure of claim 8 wherein the heater is recessed within the die and spaced therefrom by a forming cup formed from a quick release plastic material, said cup bending the edge of closure around an upraised portion surrounding the pour opening of the container to be sealed.

10. An apparatus according to claim 8 and further characterized by a dielectric disc carried by the die punch and having one of its faces presented toward the aperture, the closed shape of the heater element extending across the face presented toward the aperture and the contacts extending along the sides of the disc and up over the opposite face of the disc, whereby the heater element is secured to the disc.

11. An apparatus according to claim 10 and further characterized by conductors threaded into the dielectric disc and securing the contacts against the opposite face of the disc, the conductors being in electrical contact with the contacts.

12. An apparatus according to claim 11 wherein the conductors are rod-like elements mounted for limited axial shifting movement with respect to the die punch.

13. An apparatus for cutting individual closures from a continuous strip of thermosetting material and for applying the individual closures to the spout of a container said apparatus comprising a die member provided with an aperture, feed means for guiding the strip of thermosetting material across the aperture, means for positioning the spout of the container on one side of and in registration with the aperture, a die punch mounted for movement toward the continuous strip and into the opposite side of the aperture so that a closure is cut from the continuous strip as the die punch enters the aperture, and a heater element carried by the die punch and including a portion which closes upon itself in a configuration which generally conforms to the shape of the end of the spout and a pair of tab-like contacts projecting from the closed portion, the closed portion being positioned on the die punch such that it will align with the and overlie the end of the spout when the die punch is moved into the aperture, and the tab-like contacts being placed across an electrical energy source and thereby maintained at different electric potentials so that the closed portion will heat and activate the thermosetting material, whereby the closure is bonded to the spout.

14. An apparatus according to claim 13 wherein the tab-like contacts at their junctures with the closed portion are at least twice the cross-sectional area of the smallest cross-sectional area on the closed portion.

15. An apparatus according to claim 13 wherein the tab-like contacts project from the peripheral margin of the closed portion and bisect the closed portion.

16. An apparatus according to claim 13 and further characterized by a dielectric disc carried by the die punch and having one of its faces normally presented toward the aperture, the closed portion of the heater element extending across the face presented toward the aperture and the tab-like contacts extending along the side of the disc.

17. An apparatus according to claim 16 and further characterized by a pair of first intermediate segments overlying the opposite face of the dielectric disc and a pair of second intermediate segments overlying the first intermediate segments, and wherein the tab-like contacts turn inwardly toward one another beyond the sides of the disc, the inwardly turned portions of each tab-like contact being interposed between a separate pair of first and second segments.

References Cited

UNITED STATES PATENTS

| | | | |
|---|---|---|---|
| 3,369,954 | 2/1968 | Fener | 156—583 |
| 2,073,750 | 3/1937 | McManus | 156—518 XR |
| 2,286,159 | 6/1942 | Reynolds | 156—517 XR |
| 2,423,333 | 7/1947 | Miller | 156—518 |
| 3,248,851 | 5/1966 | Ford | 53—373 |
| 3,166,459 | 1/1965 | Imhof | 156—380 |
| 3,170,275 | 2/1965 | Rohdin et al. | 53—373 |
| 3,337,716 | 8/1967 | Krause | 219—541 |

EARL M. BERGERT, *Primary Examiner.*

MARTIN L. KATZ, *Assistant Examiner.*

U.S. Cl. X.R.

156—521, 530, 583; 53—39